(12) United States Patent
Zhang

(10) Patent No.: US 7,217,407 B2
(45) Date of Patent: May 15, 2007

(54) PLASMA SYNTHESIS OF METAL OXIDE NANOPARTICLES

(75) Inventor: Lu Zhang, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 212 days.

(21) Appl. No.: 10/933,557

(22) Filed: Sep. 3, 2004

(65) Prior Publication Data

US 2005/0118094 A1 Jun. 2, 2005

Related U.S. Application Data

(60) Provisional application No. 60/501,954, filed on Sep. 11, 2003.

(51) Int. Cl.
*C01B 13/20* (2006.01)
*C01B 13/22* (2006.01)
*C01G 23/00* (2006.01)

(52) U.S. Cl. ............... 423/610; 423/611; 423/612; 423/613; 423/DIG. 10; 204/164; 977/773; 977/775; 977/777; 977/811

(58) Field of Classification Search ............ 423/592.1, 423/610, 608, 335, 337, 277, 278, 304, 625, 423/DIG. 10, 611, 612, 613; 204/164; 977/773, 977/775, 777, 811
See application file for complete search history.

(56) References Cited

U.S. PATENT DOCUMENTS

| 3,481,693 | A | * | 12/1969 | Skrivan ............ 423/613 |
| 3,486,913 | A | * | 12/1969 | Zirngibl et al. ........ 106/425 |
| 3,574,546 | A | * | 4/1971 | Skrivan ............ 423/613 |
| 5,698,177 | A | | 12/1997 | Pratsinis et al. |
| 5,749,937 | A | * | 5/1998 | Detering et al. ........ 75/10.19 |
| 5,788,738 | A | | 8/1998 | Pirzada et al. |
| 5,851,507 | A | | 12/1998 | Pirzada et al. |
| 5,861,132 | A | | 1/1999 | Pratsinis et al. |
| 5,935,293 | A | | 8/1999 | Detering et al. |
| 6,254,940 | B1 | | 7/2001 | Pratsinis et al. |
| RE37,853 | E | * | 9/2002 | Detering et al. ........ 75/10.19 |
| 6,824,758 | B2 | * | 11/2004 | Tanaka et al. ......... 423/613 |
| 6,994,837 | B2 | | 2/2006 | Boulos et al. |
| 2001/0014396 | A1 | | 8/2001 | Tanaka et al. |
| 2002/0004029 | A1 | | 1/2002 | Jang et al. |
| 2003/0143153 | A1 | | 7/2003 | Boulos et al. |
| 2006/0159596 | A1 | | 7/2006 | De La Veaux et al. |

FOREIGN PATENT DOCUMENTS

| JP | HEI 5 (1993)-84948 | 4/1993 |
| SU | (11) 1043154 | 9/1983 |
| WO | WO 2004/056461 | 7/2004 |

OTHER PUBLICATIONS

A.I. Khoma et. al., High Disperse Titanium Dioxide Preparation Combust Titanium Tetra Chloride Oxygen Contain Gas Hydrogen Mixture, Derwent Publications Ltd., 1983, XP-002310122.
S. Brunauer et. al., JACS 60,309, 1938, A Micromertics ASAP 2405 (A Trademark of Micromeritic, Inc., Atlanta, GA).
European Search Report Dated Dec. 30, 2004, European Appln. No. 04255464.2-2111, Euopean International Filing Date—Mar. 16, 2005, Pages (4).

* cited by examiner

Primary Examiner—Timothy C. Vanoy

(57) ABSTRACT

The present invention is a method of increasing particle surface area and decreasing the concentration of over-sized particles in a process for making metal oxide particles, particularly nanoparticle $TiO_2$, in an inlet-fed, plug flow, plasma reactor by vapor phase reaction of titanium tetrachloride and oxygen in the presence of a source of hydrogen to form titanium dioxide particles.

8 Claims, 3 Drawing Sheets

PLASMA SYNTHESIS OF METAL OXIDE NANOPARTICLES

CROSS REFERENCE TO RELATED APPLICATIONS

This application claims the benefit of U.S. Provisional Application No. 60/501,954, filed on Sep. 11, 2003, which is incorporated herein by reference in its entirety.

FIELD OF THE INVENTION

The present invention relates to a method for making metal oxide-containing particles, particularly nanoparticles and more particularly titanium dioxide-containing nano-sized particles on a plasma reactor. More particularly, the invention relates to a source of hydrogen as a co-plasma.

BACKGROUND OF THE INVENTION

Scientific and commercial potential of nanoparticle materials currently attracts much attention. This fact is true in the case of nanoparticle titanium dioxide. Methods of making nanoparticle titanium dioxide include colloidal precipitation, mechanical grinding and gas phase nucleation and growth.

Gas phase synthesis offers advantages over both colloidal precipitation and mechanical processes, but in gas phase synthesis (sometimes called an aerosol process) continues to face challenges in control of particle size distribution and degree of aggregation and agglomeration.

Various methods have been taught to control nano particle primary particle size and particle size distribution. For example, U.S. Pat. Nos. 5,935,293 and 5,749,937 to Detering et al., U.S. Pat. Nos. 5,788,738 and 5,851,507 to Pirzada et al., and U.S. Pat. No. 5,935,293 to Rao et al., all teaching methods related to rapid quench or expansion of product gases.

Applicant's own U.S. application Ser. No. 60/434,158 teaches a flow homogenizing device that provides a nearly 1-dimensional flow and concentration profile in the reaction zone as a means to narrow particle size distribution.

U.S. Patent Application Publication 2002/0004029 A1 to Jang et al. teaches a flame hydrolysis in which hydrogen is one of five reactants fed into a reactor to produce titanium dioxide from reaction of titanium tetrachloride. Russian Patent SU (11) 1043154 teaches a flame hydrolysis of titanium tetrachloride in an oxygen-containing gas and hydrogen, and Japanese Kokai Patent Application Hei 5[1993]-84948 teaches a vapor phase hydrolysis reaction of titanium tetrachloride. Each of these publications teach a method to make titanium dioxide from titanium tetrachloride that involves the presence of hydrogen, but in each case a hydrogen oxygen reaction is the source of the flame.

SUMMARY OF THE INVENTION

The present invention relates to a method for synthesizing nano-sized metal oxide-containing particles in a plasma process comprising vapor phase reacting a metal halide and oxygen in the presence of a source of hydrogen in an amount sufficient to form metal oxide nanoparticles wherein the average particle size is below 100 nm in diameter and a minor proportion of the particle aggregates are above 100 nm in diameter.

The present invention additionally relates to a method of making nanosize metal oxide-containing particles in a plasma reactor, comprising:

(a) injecting into the reactor a feed gas containing oxygen and a metal halide vapor;
(b) injecting a source of hydrogen into the reactor;
(c) generating a plasma; and
(d) contacting the feed gas with the plasma in the presence of the hydrogen in an amount sufficient to form a product mixture containing metal oxide nanoparticles wherein the average particle size is below 100 nm in diameter and a minor proportion of the particle aggregates are above 100 nm in diameter.

The present invention still additionally relates to a vapor phase reactor process for the production of nanoparticle titanium dioxide by oxidation of a reaction mixture comprising titanium tetrachloride and oxygen, comprising either adding a plasma feed comprising a source of hydrogen into the reaction mixture or adding hydrogen containing compound in advance of or simultaneously with the initiation of the oxidation reaction.

In a further embodiment, the invention relates to a process for improving dispersibility of metal oxide particles synthesized in a plasma reactor, the process comprising: vapor phase reacting a metal halide and oxygen in the presence of a source of hydrogen in an amount sufficient to form metal oxide particles having a unimodal particle size distribution.

The product mixture can be optionally quenched.

In the practice of the present method, it is preferred that the oxygen present in the feed gas be in excess of the stoichiometric amount of oxygen required to react with the titanium tetrachloride present in the feed gas. It is even more preferred that the oxygen present in the feed gas is more than 2 times the stoichiometric amount of oxygen required to react with the titanium tetrachloride present in the feed gas.

In another embodiment, the present invention may be applied to any gas phase, plug flow, inlet-fed reactor process for the production of titanium dioxide by oxidation of a reaction mixture containing titanium tetrachloride and oxygen, either by the addition of a source of hydrogen into the reaction mixture or in advance of, or simultaneously with, the initiation of the oxidation reaction.

The method of the present invention may be applied to the plasma synthesis of other metal oxides from oxidation of the corresponding metal chlorides, or metal halides or mixtures of metal chlorides or mixture of metal chlorides.

Chlorides selected from the group of consisting of titanium, zirconium, hafnium, silicon, boron and mixtures of these are particularly suited to use in the present process. The present method may be used to produce nanoparticles and other particle size distributions of metal oxide particles.

DETAILED DESCRIPTION

The present invention may be applied to any gas phase, plug flow, inlet-fed reactor for the oxidation of metal halides to metal oxide powders. For example, in the case of titanium dioxide, the process of the present invention may also be applied to a plug flow, inlet-fed reactor process to improve the dispersibility and particle size characteristics of nanoparticles, pigment particles or particles in other size range where improved dispersibility and reduced fraction of oversized particles is of value.

The process is not restricted only to the oxidation of titanium tetrachloride. Halides other than chlorides may serve as a starting material. Other metal oxides may also be made using the present process. Halides, particularly chlorides, selected from the group consisting of titanium, zirconium, hafnium, silicon, and boron halides and mixtures of these halides are particularly suited to use in the present process. The present method may be used to produce nanoparticles and other particle size distributions of metal oxide particles.

As used herein, "nano-sized" or "nanoparticle" refers to a powder comprised of particles with an average particle size in the less than 100 nm range. Generally, the particle surface area of these particles is in the range of about 40 to about 150 $m^2/g$. Typically, by the process of this invention, particles can be made such that the primary particle size is below 100 nm in diameter. Primary particles form aggregates in the gas phase process. A major proportion of the aggregates are below 100 nm in diameter. A minor proportion of the aggregates are above 100 nm in diameter. By the term "minor proportion" it is meant that 0 to about 10 Vol. %, preferably about 0 to about 8 Vol. %, more preferably about 0 to about 5 Vol. % of the particles are above 100 nm. The inventor has discovered that, with the present invention, when a source of hydrogen is added as co-plasma in advance of, or simultaneously with, the initiation of the oxidation reaction, and in a sufficient amount the population of oversized, large particle aggregates is reduced, which results in improved particle dispersibility.

Figure 1:
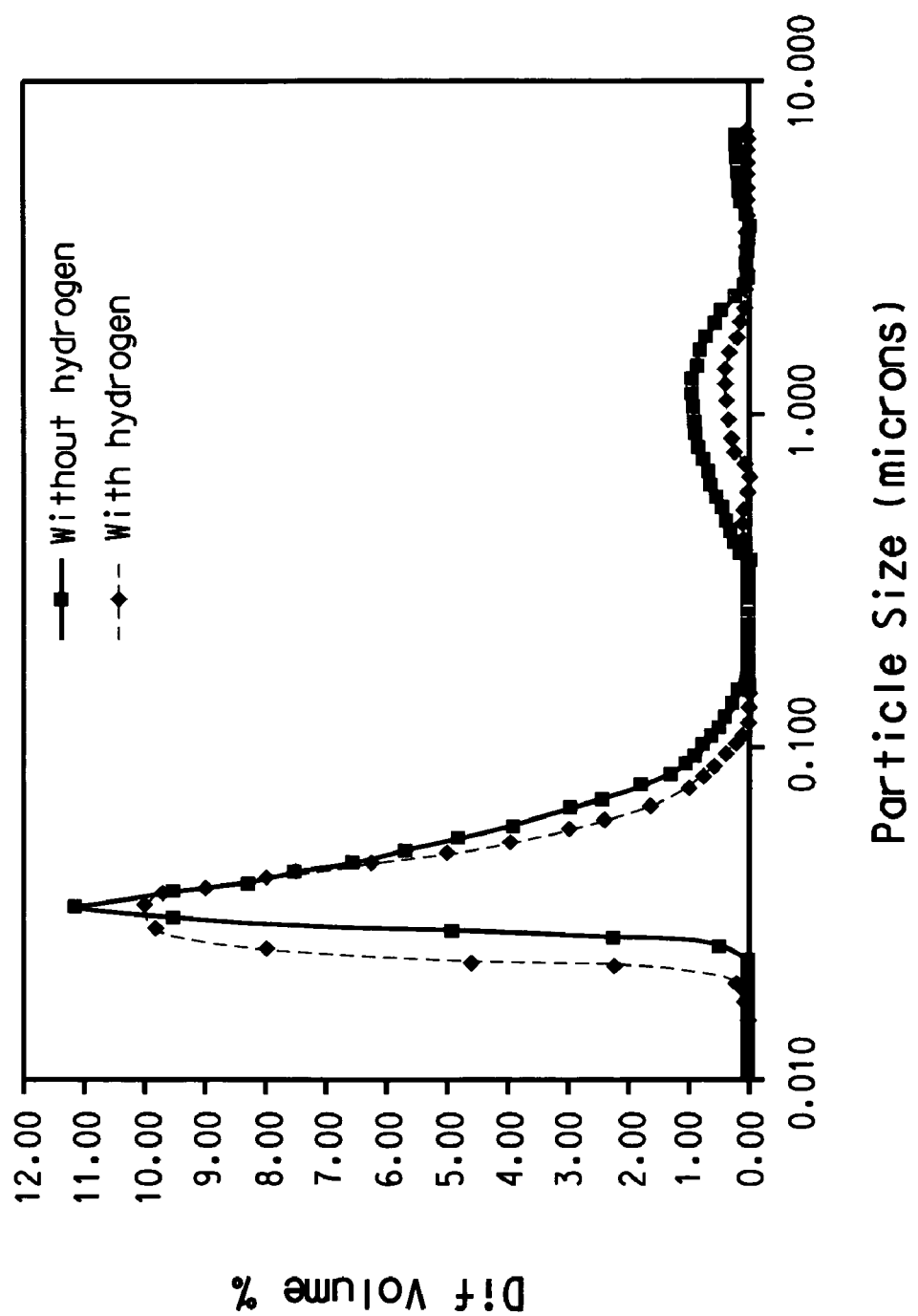
FIG. 1 is a graph showing the effect of adding a source of hydrogen as a co-plasma on the resulting titanium dioxide particles size distribution

Oversized, large particles generally represent a second modality of particle size distribution in the overall dispersible particle distribution of the product. FIG. 1 provides a typical product particle size distribution of product made using the process of the present invention compared to a particle size distribution of a control (see the Examples and the Comparative Example, below). That is, particles were made in the same reactor and under the same reaction conditions, except there was no source of hydrogen plasma addition according to the present invention.

When the instant process is employed particles of substantially unimodal particle size distribution can be made such that the statistical distribution will have a single peak and any second peak, if present, will be very small. The vol. % of the second peak is below about 5 %, preferably below about 2 %, more preferably below about 0.5 %. A completely unimodal particle size distribution is also considered possible.

Particle size distribution described herein refers to the dispersible particle size distribution instead of the distribution of primary particles. The measurement was performed on liquid dispersion of solid particles by dynamic light scattering.

FIG. 1 shows that the present process decreases the population of particles in the range of about 1-micron when a source of hydrogen is added as a co-plasma. The energy source in the present process is preferred to be DC arc plasma that delivers energy into the reaction zone by means of a hot carrier gas. Other energy sources useful in the present invention are those that produce a plasma, for example, radio frequency (RF) plasma, laser or other energy sources that deliver the carrier gas into the reactor as a plasma. The carrier gas may be a gas inert to the reactants such as argon or it may be a reactant. In the case of the present invention, oxygen could be introduced as plasma, but the hydrogen plasma must be delivered by a second inert-to-reaction with hydrogen plasma carrier gas.

The term "hydrogen plasma" as used herein means a mixture of a relatively small amount of a source of hydrogen into a carrier gas and this mixture then is heated to plasma conditions for at least the carrier gas. In the Examples presented below, the plasma is a heated mixture of an argon carrier gas and source of hydrogen heated by a DC arc plasma torch. The argon carrier gas ionizes in the heating process to form argon plasma. The hydrogen may or may not be ionized in this process, but it exists in some activated form at the temperature of the argon or carrier gas plasma. Any suitable source of hydrogen is contemplated for use in this invention. Examples, without limit, include hydrogen or water.

In the present process, except for the location of the hydrogen plasma addition, the order and location of addition of reactants to a reactor is not important. Titanium tetrachloride may be premixed with oxygen via a bubbler system, for example and injected together into the reactor. Titanium tetrachloride and oxygen may also be introduced separately as well through one or more injector ports.

According to the present process, a source of hydrogen is typically added in amounts ranging from between about 1 and about 5 percent of the total plasma gas. However, the exact amount can vary depending upon the hydrogen source and reaction conditions. The amount sufficient to achieve the objectives of the invention would be easily determined by those skilled in the art. The source of hydrogen may be mixed with the inert gas before entering the reactor or added via separately ports in a way that the hydrogen forms hydrogen radicals before contacting the titanium tetrachloride and oxygen.

The reactor used in present process is a plug flow, inlet-fed reactor. The term "inlet-fed" as used herein means that at least one reactant is injected through a inlet into a reaction zone as a gas or vapor. Injection via an inlet ensures that there is turbulent mixing in the reaction zone. Various mixtures of gases that do not react with one another in advance of entering the reaction zone may be injected through a common reactor injection port and inlet. Also the geometry of one or more inlets with respect to the other inlets, flow rates of reactants or reactants mixed with carrier gasses, and number of inlets may be varied to create the conditions for acceptably turbulent mixing in the reactor.

The energy source in the present system is a plasma; energy is delivered to the reaction zone and the reactants via the hot carrier gas plasma. The reactants and inert gas flow through the reaction zone and down through the reaction chamber. Upon reaction solid particles are formed by gas phase reaction followed by nucleation, condensation and coagulation. Methods known in the art may be used to quench the reaction and collect the product particles.

In spite of the fact that there is much art in the field of oxidizing titanium tetrachloride to form titanium dioxide particles, the plasma oxidation system is unique in the field. Plasma oxidation, as known in the art, is characterized by very high temperatures, 6000 degrees Celsius in the case of the argon plasma, and by very short residence times often less than five milliseconds. Such temperatures are sufficient to form metal oxides by the process of the instant invention. Reactants are usually propelled into the reaction zone through radial inlets to ensure that mixing is turbulent. The plasma reaction system is limited by the rate mixing. And, there are some authorities that believe that plasma systems may be limited by the actual reaction kinetics. That is, that the reactant species energy level is so high and the residence time so short that some reaction common at low temperatures (1500–1600 degrees C.) may not take place at all or may proceed by mechanisms and through intermediates that unknown at these low temperatures. In view of these observations, low temperature reactions, processes and products would not be expected to be predictive of plasma systems reactions, processes or products.

The reactor specifics are not critical so long as the reactor is a plug flow reactor. An inlet-fed plug flow type reactor is preferred. In the Examples below the reactor configuration of U.S. patent application Ser. No. 60/434,158 was used. This is shown in FIG. 2.

Figure 2:
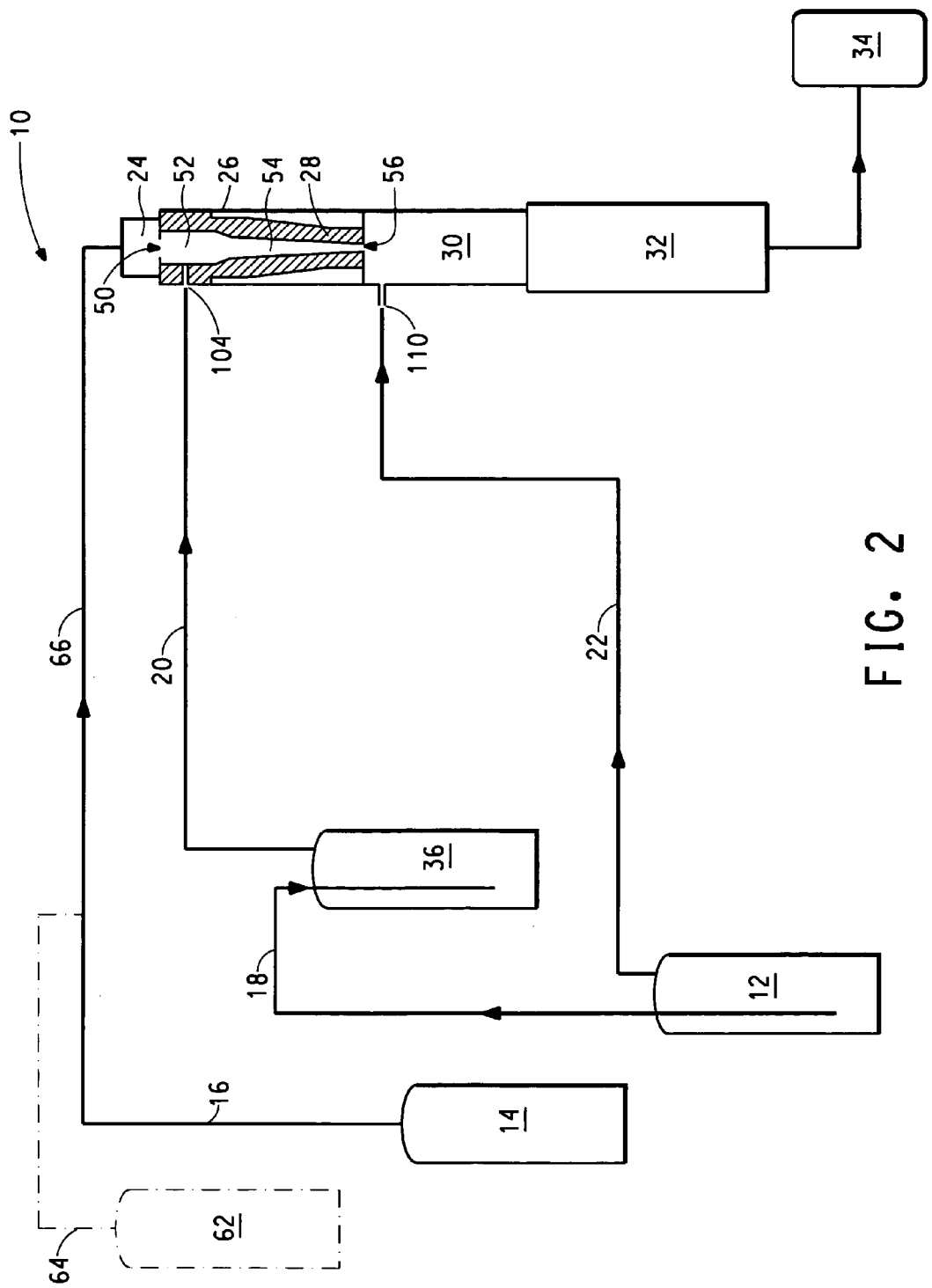
FIG. 2 is a simplified schematic flow diagram of the process of the present invention.

Thus referring to FIG. 2, the carrier gas is the gas or gas mixture that enters the reactor chamber via line 66. The carrier gas may be a mixture of an inert gas and at least one reactant. For example, in the use of the present invention to make $TiO_2$ nanoparticles, the carrier gas may be argon alone or a mixture of argon and hydrogen, or a mixture of argon and oxygen, or any inert gas or inert gas and oxygen. In the present invention the term "reactant inlets" are a means to introduce at least one reactant into the reaction chamber. The reactant may be mixture of one or more reactant gases or vapors with or without an inert gas, where reactants include at least one or a mixture of reaction agent compounds that are required to make the desired product. It is essential for achieving the desired particle size distribution that no reaction be initiated between the reactants before the reaction components enter the reaction chamber.

The reaction chamber of the present invention comprises a wall, an inlet and an outlet, the inlet for introducing a hot carrier gas to the reaction chamber, and the hot carrier gas flows from the inlet through the reaction chamber and out the outlet. It can further comprises a homogenizer which provides the spacer zone and the homogenization zone. The homogenizer can be made of any suitable material, with copper or ceramic materials being preferred.

A feature of this invention is a reaction chamber that is used in a high temperature aerosol reactor for the controlled synthesis of nanoparticles. This reaction chamber promotes near one-dimensional flow and concentration profiles by enhanced mixing of the reactants and carrier gas as these gases flow down stream through the spacer zone, the homogenization zone, and into the quench zone. The reaction chamber can be used with very small pressure gradients.

Figure 3A:
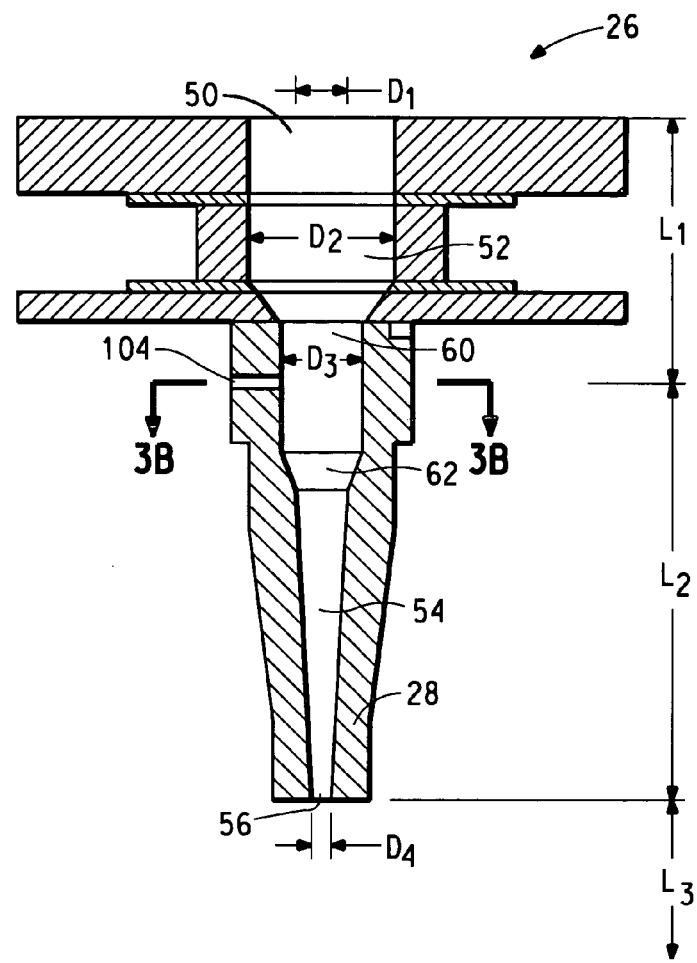
FIGS. 3A and 3B schematically shows the reaction chamber of FIG. 2.

Throughout the Figures herein, recurring elements are designated with by the same number and symbol. A plasma reactor system according to the present invention (a nanoparticle generating reactor or aerosol reactor) 10 is schematically shown in FIG. 2. The reaction chamber 26 is schematically shown in FIG. 3A.

In FIG. 2, the reactor consists of a high temperature energy source 24, reaction chamber 26 (also shown in FIG. 3A), quenching chamber 30 and product collector 32. Each of these regions of the reactor chamber can be cooled by fluid circulating within the walls of the reactor chamber (not shown). The preferred cooling fluid for use in the present invention is water.

In a preferred embodiment, the energy source 24 is a DC arc plasma torch. The plasma carrier gas is either pure argon or a mixture of argon and hydrogen. Argon gas 16 is supplied from tank 14 and hydrogen gas 64 is supplied from tank 62. The plasma carrier gas is supplied through line 66 to the energy source 24. The energy source is also cooled by a cooling fluid circulation through a cooling jacket (not shown). The preferred coolant is water. The reaction chamber of the present invention comprises a wall 28, an inlet 50 and an outlet 56, the inlet for introducing a hot carrier gas to the reaction chamber, and the hot carrier gas flows from the inlet through the reaction chamber and out the outlet. It further comprises a homogenizer which provides the spacer zone 52 and the homogenization zone 54.

The reaction chamber may be made of any material of construction that is suitable for use in high temperature, oxidizing and/or corrosive environments. High purity alumina can be employed. It may be made of a material of construction that meets the following requirements: a good heat insulator; able to withstand temperatures that can be achieved using plasma heating; able to survive thermal shock; able to survive oxidizing and reducing environments depending on the application; and able to survive a corrosive environment. The homogenizer can be made of any suitable material, with ceramic materials being preferred.

Figure 3B:
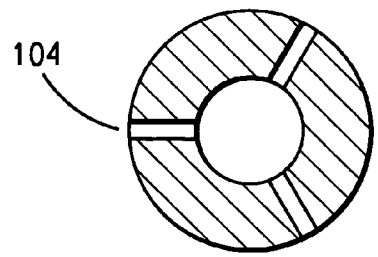

The reactants can consist of titanium tetrachloride, oxygen and optionally other chloride selected from aluminum, phosphorous, silicon, or boron or mixtures of these. Titanium tetrachloride vapor is generated by bubbling oxygen stored in cylinder 12 through line 18 into liquid reactant $TiCl_4$ stored in cylinder 36. The combined mixture of all the reactants are injected through line 20 into the reaction chamber through inlet 104 (preferably three equally-spaced radial inlets which provide entry to the flow homogenizer through three radial ports as shown in FIG. 3B).

On entering the reaction chamber and contacting the hot carrier gas flow from the energy source, the reaction is initiated and continues as the reactants flow downstream toward reaction chamber exit 56, and into the quench zone, into the quenching chamber 30, where quenching gas 22 from tank 12 is radially introduced into the the quench chamber through inlets 110. Additionally, the temperature of the aerosol stream is reduced by mixing with the quenching gas. As a result the rates of particle coagulation and aggregation are reduced. Further downstream the particles are collected in the product collector 32. In the present example, a sintered metal filter is used to collect the product, although any suitable collection device, made of a suitable material, could be used. The gas flow exiting the filter is discharged into a scrubber 34. In one embodiment of this process, primary particles in the sub-50 nm range are formed with the reaction chamber.

As shown in FIG. 3A, the reaction chamber can consist of two zones. A zone between the hot gas inlet 50, having diameter $D_1$, and one or more reactant inlets 104 in the spacer zone 52, having an upper diameter $D_2$, converging to a lower diameter $D_3$ at the reactant inlets, and has length $L_1$. The region between the reactant inlets 104 and the quench chamber inlet 56 is the homogenization zone 54, having length $L_2$. The spacer zone length $L_1$ must be long enough to have the hot gas flow attached before reaching the reactant inlets. The flow detachment is caused by expanding the hot gas into the spacer region as a free jet, thus inducing flow recirculation. The optimal length of the spacer zone is dependent on the temperature and flow rate of the hot gas, the hot gas inlet 50 with diameter $D_1$ and the diameter of the reactant inlet region 60 $D_3$. Making the spacer zone any longer is at the expense of wasting high temperature energy. The homogenization zone has an initial tubular region followed by a first converging section 62. The homogenizer is designed to have a minimum residence time so that the following tasks are completed before the gas flow exiting the homogenizer: (1) creation of one-dimensional flow and concentration profile; (2) initiation of gas-phase nucleation. This serves as the base of determining the length of the homogenization zone $L_2$, and the diameters $D_3$ and $D_4$, the diameter of the entrance to the quench chamber. Therefore, the dimensions are calculated based on the reaction rate, rate of mixing induced by diffusion and turbulence and nucleation rate. Increasing the flow residence time by increasing the volume of the homogenization zone for fixed flow rate is not advantageous. Once the nuclei are formed the aerosol stream should be quenched immediately so that the particle growth by coagulation and coalescence can be reduced as the temperature decreases. Therefore, a minimum length for the homogenization zone is preferred. Experimentation or calculation may determine the optimal length of the zone with respect to the particular product desired and the process conditions.

In FIG. 3A, an optional straight extension section of length $L_3$ may be added to the end of the reaction chamber at 56 to adjust final product properties. The length of this zone, $L_3$, does not seem critical. The extended zone may be needed for achieving the desired taper for the inlet tip or for mechanical reasons, for example.

The term "attached" or "attachment" with respect to fluid flow refers to a region where, in moving perpendicular from the boundary wall into the bulk of the fluid, the flow parallel to the boundary does not change sign (that is, the flow parallel to the boundary is moving in the same direction, varying only in amplitude). The term "separated" with respect to fluid flow refers to a region where, in moving perpendicular from the boundary wall into the bulk of the fluid, the flow parallel to the boundary changes sign. The zone between "separated" flow and "attached" flow is referred as the "stagnation point" and represents a singular solution to the boundary layer fluid equation.

The reactant(s) are injected directly radially into the reaction chamber. FIG. 2 illustrates one inlet 104 and FIG. 3B, a cross-section of the reaction chamber inlet, illustrates three equally-spaced radially-distributed inlets. It is preferable to have multiple inlets.

A high temperature energy source for heating (24) is employed in the present invention. Non-limiting examples of the heating means include Direct Current (DC) arc plasma, Radio Frequency (RF) plasma, electric heating, conductive heating, flame reactor and laser reactor. Particularly useful means in the present invention are DC arc plasma and RF plasma.

A reactant stream (20) is employed in the present invention. The stream can be in liquid, solid, vapor, emulsion, dispersion, solution or powder form, or any combination thereof. Non-limiting examples of feed materials include solid particles carried by an inert gas, a reactant gas or combination thereof; a solid precursor positioned inside the heating zone; liquid droplets carried by an inert gas, a reactant gas or combination thereof; vapor phase precursor carried by an inert gas or reactant gas or combination thereof, wherein the vapor phase precursor is a suspension of solid particles and liquid droplets that are generated by an auxiliary apparatus and fed into the apparatus and process of the current invention. Sizes of particles and liquid droplets may be of any useful size.

The shape and dimension of the reaction chamber can be predetermined by both experiment and modeling in order to obtain the desired fluid dynamics feature.

A reactant inlet (104) is comprised of a tube, and is employed in the present invention. This tube can be made of any material of construction that can survive a corrosive environment, or any other environment determined by the reactants. Preferably the diameter of the tube is small enough so that high velocities of the reactants are achieved, thereby allowing the reactants to penetrate into the high temperature plasma. The diameter of the tube is determined by the flow rate and desired turbulence.

This reactor is an example of a reactor design useful in the present process. The present process improves the particle size distribution and decreases the population of oversized particles in product made using the special design of this reactor.

The present process increases the dispersibility of nanoparticles as a result of a decreased production of oversized, large particle population. Generally, an decrease in the fraction of oversized particles of samples with the same surface area indicates an improved dispersibility.

Titanium dioxide nanoparticles made according to the present invention may be used with advantage in various applications including sunscreen and cosmetic formulations; coatings formulations including automotive coatings, wood coatings, and surface coatings; chemical mechanical planarization products; catalysis products including photocatalysts used in water and air purification and selective catalytic reduction catalyst supports; plastic parts, films, and resin systems including agricultural films, food packaging films, molded automotive plastic parts, and engineering polymer resins; rubber based products including silicone rubbers; textile fibers, woven and nonwoven applications including polyamide, polyaramide, and polyimide fibers products and nonwoven sheets products; ceramics; glass products including architectural glass, automotive safety glass, and industrial glass; electronic components; and other uses.

In one embodiment the invention can be construed as excluding any element or process step that does not materially affect the basic and novel characteristics of the composition or processes. Additionally, the invention can be construed as excluding any element or process step not specified herein.

The following Examples are not intended to limit the present invention, but to illustrate at least some of the benefits of the present invention.

Test Methods

The analytical methods that are listed in Table 1 are BET surface area and UPA particle size distribution. These techniques are described in the following section.

BET Surface Area

The surface areas of powders and solids are calculated using the adsorption of nitrogen at its boiling point via the BET method, S. Brunauer, P. H. Emmett, and E. Teller, JACS 60, 309 (1938). A MICROMERITICS ASAP 2405 (a trademark of Micromeritics, Inc., Atlanta, Ga.) adsorption apparatus is used to measure the amount of nitrogen sorbed; the BET equation is used to calculate the amount of nitrogen corresponding to a monolayer for a given sample. Using an area of 16.2 $Å^2$ per nitrogen molecule under the sorption conditions, the surface area per gram of solid is calculated. Surface area standards from the National Institute of Standards & Technology are run to insure that the reported values are accurate to within a few percent. For non-porous solids (nearly spherical or cubical), the BET surface area can be compared with the size obtained from another technique (e.g. microscopic or particle size analysis). The relationship is:

$$SA = \frac{6}{\rho * D}$$

where SA is the surface area in $m^2/g$, $\rho$ the density in g/cc, and D the diameter in microns ($\mu m$). This relationship is exact for spheres and cubes. Therefore the higher the surface area the smaller the particle size.

UPA Particle Size Distribution

The MICROTRAC ULTRAFINE PARTICLE ANALYZER (UPA) (a trademark of Leeds and Northrup, North Wales, Pa.) uses the principle of dynamic light scattering to measure the particle size distribution of particles in liquid suspension. The measured size range is 0.003 $\mu m$ to 6 $\mu m$ (3 nm to 6000 nm). The dry particle sample needs to be prepared into a liquid dispersion to carry out the measurement. An example procedure is as follow:
(1) Weigh out 0.08 g dry powder.
(2) Add 79.92 g 0.1% tetrasodium pyrophosphate (TSPP) solution in water to make a 0.1 wt. % suspension.
(3) Sonify the suspension for 10 minutes using an ultrasonic probe. The suspension should be cooled in a water-jacketed beaker during sonication.

When sonication is complete, draw an aliquot for analysis.

EXAMPLES

Unless otherwise specified, all chemicals and reagents were used as received from Aldrich Chemical Co., Milwaukee, Wis.

One reactor suitable for use in the present invention is the reactor described in the U.S. patent application Ser. No. 60/424,158. This reactor configuration was used in the Examples presented below and is schematically shown in FIG. 2.

In FIG. 2, the reactor consists of a high temperature energy source 12, reaction chamber 14, quenching chamber 16 and product collector 18. Each of these regions of the reactor chamber is cooled by fluid circulating with in the walls of the reactor chamber. There are two circulation zones for cooling fluid to circulate in the walls of the reactor chamber. One cooling fluid circulation is about the particle collector with fluid entering at port 36 and exiting at port 38. The second cooling fluid entering at port 40 and exit at port 42. The energy source is DC arc plasma torch. When argon is a component of the feed gas 28, the DC arc plasma torch is particularly preferred.

The heating source is also cooled by a cooling fluid circulation through a cooling jacket. This cooling circulation is separate and apart from the cooling circulations of the reactor chamber and shown in FIG. 2 as 46 and 48.

A specially designed flow homogenizer 26 is located inside of the reaction chamber 14.

The reactants, titanium tetrachloride and oxygen, are injected into the flow homogenizer as vapor in a carrier gas (oxygen) by first bubbling oxygen housed in cylinders 52 into a liquid reactant titanium tetrachloride stored in 54. On entering the flow homogenizer and contacting the hot feed gas flow from the torch, the reaction is initiated and continues as the reactants flow down stream from the flow homogenizer entrance into the quenching chamber 16, where quenching gas 32 is radially introduced into the region between the homogenizer and the water-cooled holder 30. Further downstream the particles are collected in the product collector 18.

Comparative Example

Titanium tetrachloride vapor was thoroughly premixed with oxygen by bubbling oxygen at a rate of 10 l/min through a cylinder maintained at room temperature that contains liquid titanium tetrachloride. Argon was used as the plasma gas.

The mixture of titanium tetrachloride and oxygen was then injected into the reaction chamber through three equally spaced radial ports that were 0.02 cm in diameter. The reaction chamber was of cylindrical shape (2.52 cm in diameter, 7.56 cm in height) and a flow homogenizer was held inside of the reaction chamber. Titanium dioxide aerosol particles were formed by chemical nucleation as a result of the titanium tetrachloride oxidation reaction. At the end of the reaction chamber, room temperature oxygen was introduced radially into the quenching chamber at a rate of 70 l/min where the high temperature of the aerosol stream was lowered by mixing with room temperature quenching gas. The quenching chamber is of cylindrical shape (2.52 cm in diameter, 20.16 cm in height). Downstream from the quenching chamber, titanium dioxide particles were collected by a sintered metal filter. The properties of the resulting titanium dioxide particles are listed in Table 1.

Example 1

Titanium tetrachloride vapor was thoroughly premixed with oxygen by bubbling oxygen at a rate of 10 l/min through a cylinder maintained at room temperature that contains liquid titanium tetrachloride. The mixture of titanium tetrachloride and oxygen was then injected into the reaction chamber through three equally spaced radial ports that were 0.02 cm in diameter. The plasma carrier gas composed of 0.2 l/min of hydrogen and 14 l/min of argon. The reaction chamber was of cylindrical shape (2.52 cm in diameter, 7.56 cm in height) and a flow homogenizer was held inside of the reaction chamber. Titanium dioxide aerosol particles were formed by chemical nucleation as a result of the titanium tetrachloride oxidation reaction. At the end of the reaction chamber, room temperature oxygen was introduced radially into the quenching chamber at a rate of 70 l/min where the high temperature of the aerosol stream was lowered by mixing with room temperature quenching gas. The quenching chamber is of cylindrical shape (2.52 cm in diameter, 20.16 cm in height). Downstream from the quenching chamber, titanium dioxide particles were collected by a sintered metal filter. The properties of the resulting titanium dioxide particles are listed in Table 1. The effect of adding hydrogen plasma on the resulting particle size distribution is described in FIG. 1.

Example 2

The experiment in Example 1 was repeated except that the plasma gas composed of 0.5 l/min of hydrogen and 14 l/min of argon.

Example 3

The experiment in Example 1 was repeated except that the plasma gas composed of 0.7 l/min of hydrogen and 14 l/min of argon.

Example 4

The experiment in Comparative Example was repeated except that upstream from the TiCl$_4$ injection ports, 3 l/min of O$_2$ gas was introduced through the spacer zone of the flow homogenizer into the reaction chamber.

Example 5

The experiment in Example 1 was repeated except that upstream from the TiCl$_4$ injection ports, a stream of water droplets, 2–5 um in size, carried by 3 l/min of O$_2$ gas was introduced through the spacer zone of the flow homogenizer into the reaction chamber. Water was atomized at 0.1–0.2 g/min using TSI Model 3076 Constant Flow Atomizer. The effect of adding other hydrogen containing compound such as water is described in TABLE 2.

TABLE 1

|  | Comparative | Example 1 | Example 2 | Example 3 |
|---|---|---|---|---|
| H$_2$ flow rate (l/min) | 0 | 0.2 | 0.5 | 0.7 |
| Volume % of particles above 100 nm | 12.7 | 16 | 8.5 | 1.9 |
| Volume % of particles above 150 nm | 10.8 | 11 | 3.2 | 0.06 |
| Volume % of particles above 204 nm | 10 | 8 | 1.5 | 0.06 |
| Surface area (m$^2$/g) | 110 | 106 | 97 | 103 |
| Total wt % of chloride | 1.76 | 1.46 | 1.08 | 1.46 |

TABLE 2

|  | Comparative | Example 4 | Example 5 |
|---|---|---|---|
| Volume % of particles above 150 nm | 27 | 5 | 0.8 |
| Volume % of particles above 204 nm | 23 | 5 | 0.8 |
| Surface area (m$^2$/g) | 85 | 110 | 120 |

Surface area measured by BET surface adsorption Volume % above a certain size is measured by UPA dynamic light scattering As seen in Table 1, when the amount of hydrogen is increased, the fraction of oversized particle aggregates is reduced. This indicates the enhanced dispersibility and reduced particle aggregation of the primary particles.

As seen in Table 2, when water is added as a form of hydrogen, the fraction of oversized particle aggregates is also reduced. This indicates the enhanced dispersibility and reduced particle aggregation of the primary particles.

What is claimed is:

1. A method for synthesizing nano-sized titanium dioxide-containing particles in a plasma process comprising vapor phase reacting titanium halide and oxygen, the oxygen being in an amount in excess of the stoichiometric amount of oxygen required to react with the titanium, in the presence of an amount of a source of hydrogen, to form metal titanium dioxide nanoparticles wherein the average particle size is below 100 nm in diameter and a minor proportion of the particle aggregates are above 100 nm in diameter, the amount of the source of hydrogen being sufficient to provide the minor proportion of particle aggregates.

2. A method of making nanosize titanium dioxide-containing particles in a plasma reactor, comprising:
   (a) injecting into the reactor a feed gas containing oxygen and a titanium halide vapor, the oxygen of the feed gas being in an amount in excess of the stoichiometric amount of oxygen required to react with the titanium;
   (b) injecting source of hydrogen into the reactor;
   (c) generating a plasma; and
   (d) contacting the feed gas with the plasma in the presence of the hydrogen in an amount sufficient to form a product mixture containing titanium dioxide nanoparticles wherein the average particle size is below 100 nm in diameter and a minor proportion of the particle aggregates are above 100 nm in diameter.

3. The method of claim 2, further comprising quenching the product mixture and recovering the formed nanoparticles.

4. The method of claims 1 or 2, wherein the titanium halide is a titanium oxyhalide.

5. The method of claim 1 or 2, wherein the titanium halide is titanium tetrachloride.

6. The method of claim 1 or 2 wherein the oxygen is more than 2 times the stoichiometric amount of oxygen required to react with the titanium halide.

7. The process of claim 1 or 2 wherein hydrogen represents from 1% to 5% by volume of the total plasma of the plasma process.

8. The process of claims 1 or 2, wherein the hydrogen is introduced by hydrogen sources selected from the group consisting of hydrogen gas, water, water vapor, hydrides, and combinations thereof.

* * * * *